(12) United States Patent
Akada et al.

(10) Patent No.: US 10,626,044 B2
(45) Date of Patent: Apr. 21, 2020

(54) ULTRAVIOLET-RADIATION ABSORBING GLASS PRODUCT

(71) Applicant: AGC Inc., Chiyoda-ku (JP)

(72) Inventors: Shuichi Akada, Tokyo (JP); Soshi Watanabe, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/914,167

(22) Filed: Mar. 7, 2018

(65) Prior Publication Data

US 2018/0194668 A1    Jul. 12, 2018

Related U.S. Application Data

(63) Continuation of application No. PCT/JP2016/076628, filed on Sep. 9, 2016.

(30) Foreign Application Priority Data

Sep. 11, 2015   (JP) .................................. 2015-179719

(51) Int. Cl.
   *C03C 3/087*   (2006.01)
   *C03C 4/08*    (2006.01)

(52) U.S. Cl.
   CPC .............. *C03C 3/087* (2013.01); *C03C 4/085* (2013.01)

(58) Field of Classification Search
   CPC ................................. C03C 3/087; C03C 4/085
   See application file for complete search history.

(56) References Cited

U.S. PATENT DOCUMENTS

| | | | |
|---|---|---|---|
| 5,827,344 A | 10/1998 | Fyles et al. | |
| 5,837,629 A | 11/1998 | Combes et al. | |
| 6,071,840 A | 6/2000 | Sasage et al. | |
| 6,413,893 B1 | 7/2002 | Shelestak et al. | |
| 6,800,575 B1 | 10/2004 | Coster et al. | |
| 2002/0155939 A1 | 10/2002 | Seto et al. | |
| 2002/0164487 A1* | 11/2002 | Seto ........................ | C03C 3/087 428/426 |
| 2004/0038799 A1 | 2/2004 | Landa et al. | |
| 2004/0157721 A1* | 8/2004 | Foguenne ............... | C03C 3/087 501/70 |
| 2004/0186002 A1 | 9/2004 | Seto et al. | |
| 2012/0058879 A1 | 3/2012 | Kim et al. | |
| 2018/0222788 A1* | 8/2018 | Akada ..................... | C03C 3/087 |

FOREIGN PATENT DOCUMENTS

| | | | | |
|---|---|---|---|---|
| EP | 2 402 294 A2 | 1/2012 | | |
| JP | 08-245238 | 9/1996 | | |
| JP | 09-502420 | 3/1997 | | |
| JP | 09-208229 | 8/1997 | | |
| JP | 10-114540 | 5/1998 | | |
| JP | 11-217234 | 8/1999 | | |
| JP | 2000-247679 | 9/2000 | | |
| JP | 2000-335937 | 12/2000 | | |
| JP | 2002-522335 | 7/2002 | | |
| JP | 2003-508338 | 3/2003 | | |
| WO | WO 97/017303 | 5/1997 | | |
| WO | WO-0117920 A1 * | 3/2001 | ............. | C03C 3/087 |
| WO | WO-2017065160 A1 * | 4/2017 | ................ | B60J 1/00 |

OTHER PUBLICATIONS

Machine Translation of JP 2000-247679 A, Sep. 12, 2000. (Year: 2000).*
International Search Report dated Nov. 22, 2016 in PCT/JP2016/076628 filed Sep. 9, 2016 (with English Translation).
Written Opinion dated Nov. 22, 2016 in PCT/JP2016/076628 filed Sep. 9, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

Provided is an ultraviolet-radiation absorbing glass product, characterized by: having a transmittance of ultraviolet radiation (TUV), as specified by ISO 9050: 2003, of 2% or less at a plate thickness of 3.5 mm, and transmittance of visible light (TVA) of 8 to 28% inclusive, based on the Standard Illuminant A at a plate thickness of 3.5 mm; and the color of the glass, as denoted by the chromaticity coordinates x, y in the XYZ color coordinate system based on a 2-degree visual field of the Standard Illuminant C as specified by JIS Z8701: 1999, satisfying the following expressions (1) and (2). (1) y≥−0.735×x+0.544 (2) y≥1.389×x−0.089

18 Claims, 1 Drawing Sheet

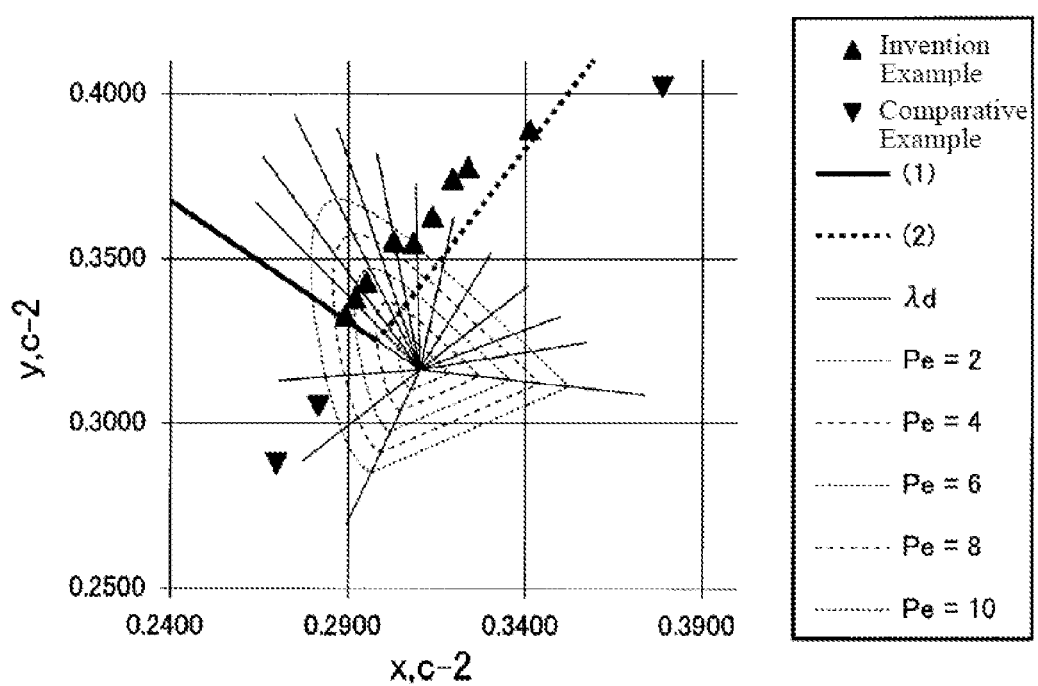

ULTRAVIOLET-RADIATION ABSORBING GLASS PRODUCT

TECHNICAL FIELD

The present invention relates to an ultraviolet absorbing glass article that is suitable as dark green glass for vehicles (particularly for automobiles).

BACKGROUND ART

As rear-side glass and rear glass for automobiles, dark green-colored glass having a significantly-reduced visible light transmittance (so-called dark green glass or privacy glass) has been put into practical use. This privacy glass is excellent in indoor comfort and reduction of air-conditioning loads due to favorable sunlight shielding performance in a wide wavelength region from an ultraviolet region through an infrared region, and is excellent in terms of possible options of color tone imparting luxury feelings, designability that is excellent from the design viewpoint, in-vehicle privacy protection, and the like.

Patent Document 1 discloses dark green glass having a soda-lime siliceous glass component as a basic composition, and containing, in wt %, 0.6 to 1.0 of $Fe_2O_3$ (total iron), 0.10 to 0.23 of FeO, ionic ratio of $Fe^{2+}/(Fe^{2+}+Fe^{3+})$ being 0.18 to 0.32, 0.010 to 0.030 of CoO, 0.030 to 0.065 of $Cr_2O_3$, and 0.0005 to 0.0030 of Se, in which a dominant wavelength by D light source is 485 to 520 nm. The dark green glass has an ultraviolet transmittance of 15% or less, a visible light transmittance of 10 to 35% and a solar radiation transmittance of 15 to 35%, and an excitation purity by D light source of 4.0 to 15.0%, at a sheet thickness of 5 mm.

PRIOR ART DOCUMENT

Patent Document

Patent Document 1: JP-A-2000-335937

SUMMARY OF THE INVENTION

Problems that the Invention is to Solve

In recent years, an interest in ultraviolet countermeasures is increasing. To respond to this, privacy glass having a lower ultraviolet transmittance (TUV), specifically, privacy glass having an ultraviolet transmittance (TUV) of 2% or less at a sheet thickness of 3.5 mm is required.

To solve the above-described problems, the present invention has an object to provide an ultraviolet absorbing glass article having an extremely low ultraviolet absorbing transmittance and suitable as privacy glass for vehicles.

Means for Solving the Problems

To achieve the above-described object, the present invention provides an ultraviolet absorbing glass article containing, in mass % based on oxides, 66 to 75% of $SiO_2$, 10 to 20% of $Na_2O$, 5 to 15% of CaO, 0 to 6% of MgO, 0 to 5% of $Al_2O_3$, 0 to 5% of $K_2O$, 0.5 to 3% of $Fe_2O_3$, 0.2 to 0.5% of FeO, 3% or less of $TiO_2$, 0.01 to 0.04% of CoO, 0.004% or less of Se, 0.06% or less of $Cr_2O_3$, and 0.1% or less of NiO, as a glass matrix composition, satisfying a Redox ([divalent iron ($Fe^{2+}$) in terms of $Fe_2O_3$]/[total of divalent iron ($Fe^{2+}$) in terms of $Fe_2O_3$ and trivalent iron ($Fe^{3+}$) in terms of $Fe_2O_3$]) being 15 to 35%, satisfying $Fe_2O_3+TiO_2$ being 1.2% or more, satisfying CoO being 0.01% or more and 0.032% or less in the case where NiO is 0%, CoO being more than 0.032% and 0.04% or less in the case where NiO is more than 0.06% and 0.1% or less, and CoO being 0.01 to 0.04% in the case where NiO is more than 0% and 0.06% or less, having $Fe_2O_3$, FeO, $TiO_2$, CoO, Se, $Cr_2O_3$ and NiO satisfying the following formula (a), having an ultraviolet transmittance (TUV) specified by ISO 9050:2003 at a sheet thickness of 3.5 mm being 2% or less, having a visible light transmittance (TVA) based on a Standard Illuminant A at a sheet thickness of 3.5 mm being 8% or more and 28% or less, and having a color of the glass, represented by chromaticity coordinates x and y in a XYZ color coordinate system based on a two-degree visual field of a Standard Illuminant C specified by JIS Z8701:1999, satisfying the following formulae (1) and (2).

$$-0.0398-0.002\times(Fe_2O_3)+0.097\times(FeO)+0.0019\times(TiO_2)+0.95\times(CoO)-21.16\times(Se)+0.66\times(Cr_2O_3)-0.030\times(NiO) \geq 0 \quad (a)$$

$$y \geq -0.735 \times x + 0.544 \quad (1)$$

$$y \geq 1.389 \times x - 0.089 \quad (2)$$

Advantageous Effect of the Invention

The ultraviolet absorbing glass article of the present invention has an extremely low ultraviolet transmittance (TUV) as 2% or less at a sheet thickness of 3.5 mm, and is therefore suitable for use as privacy glass for vehicles. The ultraviolet absorbing glass article of the present invention has a visible light transmittance (TVA) of 8% or more and 28% or less based on Standard Illuminant A at a sheet thickness of 3.5 mm, and therefore satisfies a requirement of securing the visual field. The ultraviolet absorbing glass article of the present invention is particularly preferable for rear side glass, rear glass and roof glass for automobiles.

BRIEF DESCRIPTION OF DRAWINGS

FIG. 1 is a graph showing distribution of Examples and Comparative Examples in the chromaticity coordinates (x, y) of the XYZ color coordinate system.

MODE FOR CARRYING OUT THE INVENTION

The ultraviolet absorbing glass article of the present invention contains, in mass % based on oxides, 66 to 75% of $SiO_2$, 10 to 20% of $Na_2O$, 5 to 15% of CaO, 0 to 6% of MgO, 0 to 5% of $Al_2O_3$, 0 to 5% of $K_2O$, 0.5 to 3% of $Fe_2O_3$, 0.2 to 0.5% of FeO, 3% or less of $TiO_2$, 0.01 to 0.04% of CoO, 0.004% or less of Se, 0.06% or less of $Cr_2O_3$ and 0.1% or less of NiO, as a glass matrix composition, satisfying Redox ([divalent iron ($Fe^{2+}$) in terms of $Fe_2O_3$]/[total ($Fe^{2+}$+$Fe^{3+}$) of divalent iron ($Fe^{2+}$) in terms of $Fe_2O_3$ and trivalent iron ($Fe^{3+}$) in terms of $Fe_2O_3$]) being 15 to 35%, satisfying $Fe_2O_3+TiO_2$ being 1.2% or more, satisfying CoO being 0.01% or more and 0.032% or less in the case where NiO is 0%, CoO being more than 0.032% and 0.04% or less in the case where NiO is more than 0.06% and 0.1% or less, and CoO being 0.01 to 0.04% in the case where NiO is more than 0% and 0.06% or less, having $Fe_2O_3$, FeO, $TiO_2$, CoO, Se, $Cr_2O_3$ and NiO satisfying the following formula (a), having an ultraviolet transmittance (TUV) specified by ISO 9050: 2003 at a sheet thickness of 3.5 mm being 2% or less, having a visible light transmittance (TVA) based on Standard Illuminant A at a sheet thickness of 3.5 mm being 8% or more and 28% or less, and having color of the glass represented by chromaticity coordinates x and y in XYZ color coordinate system based on two-degree visual field of Standard Illuminant C specified by JIS Z8701:1999 satisfying the following formulae (1) and (2).

$$-0.0398-0.002\times(Fe_2O_3)+0.097\times(FeO)+0.0019\times(TiO_2)+0.95\times(CoO)-21.16\times(Se)+0.66\times(Cr_2O_3)-0.030\times(NiO)\geq 0 \quad (a)$$

$$y\geq -0.735\times x+0.544 \quad (1)$$

$$y\geq 1.389\times x-0.089 \quad (2)$$

The reasons for containing the above-described components in the present invention are described below. Unless particularly otherwise indicated, "%" means mass %.

$SiO_2$ is a component forming a network and is an essential component. In the case where the $SiO_2$ content is 66% or more, weathering resistance is improved, and in the case where the content is 75% or less, viscosity does not become excessively high and this is favorable for melting raw materials. The $SiO_2$ content is preferably 67% or more and more preferably 68% or more. On the other hand, the content is preferably 72% or less and more preferably 70% or less.

$Na_2O$ is a component accelerating the melting of raw materials and is an essential component. In the case where the $Na_2O$ content is 10% or more, the melting of raw materials is accelerated, and in the case where the content is 20% or less, weathering resistance is not deteriorated. The $Na_2O$ content is preferably 11% or more and more preferably 12% or more. On the other hand, the $Na_2O$ content is preferably 18% or less and more preferably 16% or less.

CaO is a component accelerating the melting of raw materials and improving weathering resistance, and is an essential component. In the case where the CaO content is 5% or more, the melting of raw materials is accelerated and weathering resistance is improved, and in the case where the content is 15% or less, devitrification is suppressed. The CaO content is preferably 6% or more and more preferably 7% or more. On the other hand, the CaO content is preferably 13% or less and more preferably 11% or less.

MgO is a component accelerating the melting of raw materials and improving weathering resistance, and is an optional component. In the case where the MgO content is 6% or less, devitrification is suppressed. The MgO content is preferably 5% or less and more preferably 4% or less.

$Al_2O_3$ is a component improving weathering resistance and is an optional component. In the case where the $Al_2O_3$ content is 5% or less, viscosity does not become excessively high, and this is favorable for melting raw materials. The $Al_2O_3$ content is preferably 4% or less and more preferably 3% or less.

$K_2O$ is a component accelerating the melting of raw materials and is an optional component. In the case where the $K_2O$ content is 5% or less, damage on refractories of a melting furnace due to volatilization is suppressed. The $K_2O$ content is preferably 4% or less and more preferably 3% or less.

$Fe_2O_3$ which is an oxide of trivalent iron is a component absorbing ultraviolet rays and is an essential component. The $Fe_2O_3$ content is set to 0.5% or more since an ultraviolet transmittance becomes excessively large in the case where the content is lower than 0.5%. The $Fe_2O_3$ content is set to 3% or less since visible light transmittance becomes excessively small in the case where the content is too large. The $Fe_2O_3$ content is more preferably 1% or more and even more preferably 1.3% or more. On the other hand, the $Fe_2O_3$ content is more preferably 2% or less and even more preferably 1.6% or less.

FeO which is an oxide of divalent iron is a component absorbing thermal energy and is an essential component. In the case where the FeO content is 0.2% or more, sufficiently low solar radiation transmittance can be obtained. On the other hand, in the case where the FeO content is 0.5% or less, the thermal efficiency during melting raw materials is not deteriorated, and molten glass are suppressed from staying at the bottom, far from a heating source, of a melting furnace. The FeO content is preferably 0.25% or more and more preferably 0.30% or more. On the other hand, the FeO content is preferably 0.48% or less and more preferably 0.44% or less.

In the ultraviolet absorbing glass article of the present invention, Redox ([divalent iron ($Fe^{2+}$) in terms of $Fe_2O_3$]/ [total ($Fe^{2+}+Fe^{3+}$) of divalent iron ($Fe^{23+}$) in terms of $Fe_2O_3$ and trivalent iron ($Fe^{3+}$) in terms of $Fe_2O_3$]) is used as an index of the balance between visible light transmittance and solar radiation transmittance. In the ultraviolet absorbing glass article of the present invention, Redox is 15 to 35%. In the case where Redox is 15% or more, the solar radiation transmittance does not become excessively large, and in the case where Redox is 35% or less, the visible light transmittance does not become excessively small. In the ultraviolet absorbing glass article of the present invention, Redox is preferably 18% or more and more preferably 20% or more. On the other hand, Redox is preferably 30% or less and more preferably 28% or less.

$TiO_2$ is not an essential component but can be contained since it is a component decreasing ultraviolet transmittance (TUV). In the case where the $TiO_2$ is contained, the content is preferably 0.1% or more, more preferably 0.4% or more and even more preferably 0.8% or more. However, since visible light transmittance becomes too small in the case where the $TiO_2$ content is too large, the $TiO_2$ content is set to 3% or less. Furthermore, $TiO_2$ has an effect decreasing viscosity of molten glass during melting and makes it difficult for molten glass to stay. The $TiO_2$ content is preferably 2.7% or less and more preferably 2.2% or less.

In the ultraviolet absorbing glass article of the present invention, the total ($Fe_2O_3+TiO_2$) of the $Fe_2O_3$ content and the $TiO_2$ content is 1.2% or more. In the case where $Fe_2O_3+TiO_2$ is 1.2% or more, ultraviolet transmittance does not become excessively large, and the glass can be tinged with yellow. In the ultraviolet absorbing glass article of the present invention, $Fe_2O_3+TiO_2$ is preferably 1.5% or more, more preferably 1.8% or more and even more preferably 2.8% or more.

CoO is a component tinging glass with blue and is an essential component. In the case where the CoO content is 0.01% or more, the color of the glass is suppressed from being tinged with yellow, and in the case where the CoO content is 0.04% or less, the color of the glass is suppressed from being tinged with blue. The CoO content is more preferably 0.012% or more and even more preferably 0.014% or more. On the other hand, the CoO content is more preferably 0.038% or less and even more preferably 0.036% or less.

Se is not an essential component but can be contained since it is a component tinting glass with red. In the case where the Se content is 0.004% or less, it can suppress a yellow tinge. The Se content is more preferably 0.003% or less and even more preferably 0.002% or less. To suppress the glass from being tinged with blue, the Se content is preferably 0.0001% or more. The Se content is more preferably 0.0005% or more, even more preferably 0.001% or more, especially preferably 0.0015% or more and most preferably 0.0017% or more.

$Cr_2O_3$ is a component decreasing visible light transmittance without excessively increasing excitation purity in the ultraviolet absorbing glass article of the present invention, and is an optional component. In the case where the $Cr_2O_3$ content is 0.06% or less, visible light transmittance is suppressed from becoming excessively small. The $Cr_2O_3$ content is preferably 0.04% or less and more preferably 0.032% or less.

The ultraviolet absorbing glass article of the present invention preferably contains an oxide of Ni other than the above-described components. In this case, the content based on an oxide (NiO) is 0 to 1%. However, in the case where the NiO content is 0%, the CoO content is 0.01% or more and 0.032% or less. In the case where the NiO content is more than 0.06% and 0.1% or less, the CoO content is more than 0.032% and 0.04% or less. In the case where the NiO content is more than 0% and 0.06% or less, the CoO content is 0.01 to 0.04%. In the case where the NiO content and the CoO content satisfy the above-described relationship, the glass can be suppressed from being tinged with blue and brown, and can be tinged with green. The NiO content is preferably 0.07% or less and more preferably 0.045% or less. In the case where the NiO content is 0%, the CoO content is preferably 0.014% or more and more preferably 0.020% or more. In the case where the NiO content is more than 0% and 0.06% or less, the CoO content is preferably 0.022% or less and more preferably 0.018% or less.

In the ultraviolet absorbing glass article of the present invention, in the case where $Fe_2O_3$, FeO, $TiO_2$, CoO, Se, $Cr_2O_3$ and NiO satisfy the following formula (a), the glass can be tinged with green in good balance.

$$-0.0398 - 0.002 \times (Fe_2O_3) + 0.097 \times (FeO) + 0.0019 \times (TiO_2) + 0.95 \times (CoO) - 21.16 \times (Se) + 0.66 \times (Cr_2O_3) - 0.030 \times (NiO) \geq 0 \quad (a)$$

In the actual production, a refining agent such as salt cake is used and thus, 0.05 to 1.0% of $SO_3$ generally remains as the trace in the glass.

The ultraviolet absorbing glass article of the present invention may further contain any of the oxides of B, Ba, Sr, Li, Zn, Pb, P, Zr, Bi and Sn other than the above-described components. The each content of those in terms of oxides ($B_2O_3$, BaO, SrO, $Li_2O$, ZnO, PbO, $P_2O_5$, $ZrO_2$, $Bi_2O_3$ and $SnO_2$) may be 0 to 1 mass %. Those components may be contained in total preferably 0.7% or less, more preferably 0.4% or less, even more preferably 0.2% or less, and especially preferably 0.1% or less.

Also, any of Sb, As, Cl and F may be contained. Those elements can be intentionally mixed from a melting accelerator or a refining agent. Alternatively, those elements can be contained as impurities in raw materials or cullet. The contents of those may be 0 to 0.1 mass %, may be 0 to 0.05 mass %, and may be 0 to 0.01 mass %.

Also, any of the oxides of Mn, Cu, Mo, Nd and Er may be contained. The contents of those in terms of oxides ($MnO_2$, CuO, $MoO_3$, $Nd_2O_3$ and $Er_2O_3$) may be 0 to 0.1 mass %, may be 0 to 0.05 mass %, and may be 0 to 0.01 mass %.

Also, $CeO_2$ may be contained. In the case where $CeO_2$ is contained, the $CeO_2$ content may be 0 to 1 mass %. $CeO_2$ may be contained preferably 0.7 mass % or less, more preferably 0.4 mass % or less, even more preferably 0.2 mass % or less and especially preferably 0.1 mass % or less.

It is preferred that each oxide of V and W is not substantially contained. The term "not substantially contained" used herein means that those elements are not intentionally contained, and specifically means that the respective contents of those elements are 100 ppm or less in the glass.

In the case where the ultraviolet absorbing glass article of the present invention is used as privacy glass for vehicles, it is a glass having the above-described composition and has the following optical properties.

The ultraviolet transmittance (TUV) at a thickness of 3.5 mm is 2% or less and preferably 1% or less.

The visible light transmittance (TVA) at a thickness of 3.5 mm is 8 to 28%. The visible light transmittance is preferably 10% or more and preferably 22% or less.

In addition to the above-described optical properties, the energy transmittance (TE) is preferably 22% or less and more preferably 16% or less.

In addition to the above-described optical properties, the ultraviolet transmittance (TUV400) at a thickness of 3.5 mm is preferably 5% or less, more preferably 3% or less and even more preferably 2% or less.

Throughout the present description, the energy transmittance (TE) is obtained based on JIS R3106:1998, the ultraviolet transmittance (TUV) is obtained based on ISO 9050:2003, and the ultraviolet transmittance (TUV400) is obtained based on ISO 13837:2008 convention A. Furthermore, the visible light transmittance (TVA) is calculated based on Standard Illuminant A.

To make the glass dark green, in the ultraviolet absorbing glass article of the present invention, in addition to the above-described optical properties, chromaticity coordinates x and y in XYZ color coordinate system based on two-degree visual field of Standard Illuminant C specified by JIS Z8701:1999 satisfies the following formulae (1) and (2).

$$y \geq -0.735 \times x + 0.544 \quad (1)$$

$$y \geq 1.389 \times x - 0.089 \quad (2)$$

The ultraviolet absorbing glass article of the present invention has an effect that in the case where a temperature at which viscosity reaches 100 poises is 1440° C. or lower, the glass is easy to manufacture. The temperature at which viscosity reaches 100 poises is preferably 1435° C. or lower, more preferably 1410° C. or lower and especially preferably 1400° C. or lower.

The method for manufacturing the ultraviolet absorbing glass article of the present invention is not particularly limited, but, for example, it can be manufactured as follows. Blended raw materials are continuously supplied to a melting furnace and are heated at about 1500° C. by using heavy oil or the like to perform vitrification. Subsequently, this molten glass is refined and then formed into a glass sheet having a predetermined thickness by a float process or the like. Then, by cutting this glass sheet into a predetermined shape, the ultraviolet absorbing glass article of the present invention is manufactured. Thereafter, as necessary, the cut glass can be subjected to a strengthening treatment, can be processed into laminated glass or can be processed into multilayered glass.

EXAMPLES

In the following explanation, Examples 1 to 10, 14 to 15 are Invention Examples, and Examples 11 to 13 are Comparative Examples. A raw material batch was prepared by using silica sand, feldspar, dolomite, soda ash, salt cake, blast furnace slag, ferric oxide, titanium oxide, cobalt oxide, sodium selenite, chromium oxide and nickel oxide, as raw materials. Soda-lime silicate glass containing $SiO_2$: 65 to 70, $Al_2O_3$: 1.8, CaO: 8.4, MgO: 4.6, $Na_2O$: 13.3, $K_2O$: 0.7 and $SO_3$: 0.2 (unit: mass %), as basic components was used. The $SiO_2$ content was adjusted such that the total of the basic components and $Fe_2O_3$, $TiO_2$, CoO, Se, $Cr_2O_3$ and NiO which are added as absorbing components reaches 100 mass %, thereby producing a target composition. The batch was placed in a platinum-rhodium made crucible and melted in an electric furnace (in an atmosphere having $O_2$ concentration of about 0.5%). The molten glass was flowed out on a carbon plate and then annealed in another electric furnace. The obtained glass block was cut into pieces, some of the pieces were polished, and the composition thereof was analyzed by using a fluorescent X-ray analyzer. A surface of some of the pieces was polished into a mirror surface and finished such that a thickness is 3.5 mm, and spectral transmittance was measured with a spectrophotometer. FeO content was obtained by calculation from infrared transmittance at a wavelength of 1000 nm. $Fe_2O_3$ content was calculated based on total iron oxides content obtained by fluorescent X-ray analysis and the above-described FeO content.

Visible light transmittance (TVA), energy transmittance (TE), ultraviolet transmittances (TUV and TUV400) and chromaticity coordinates (x and y) were calculated based on the spectral transmittance. The relationship between the distribution of chromaticity coordinates in Invention Examples and Comparative Examples and the formulae (1) and (2) is shown in FIG. 1. In FIG. 1, (1) indicates a straight line corresponding to the above-described formula (1), and (2) indicates a straight line corresponding to the above-described formula (2).

The contents of absorbing components and optical properties of the obtained glasses are shown in the tables below.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Composition | /mass % | $Fe_2O_3$ | 1.36 | 1.36 | 1.56 | 1.36 | 1.36 | 1.36 | 1.38 |
| | /mass % | FeO | 0.39 | 0.39 | 0.39 | 0.39 | 0.39 | 0.39 | 0.42 |
| | /mass % | $TiO_2$ | 0.5 | 1.0 | 2.0 | 1.5 | 2.2 | 0.5 | 1.5 |
| | /mass % | CoO | 0.0170 | 0.0170 | 0.0170 | 0.0130 | 0.0140 | 0.0210 | 0.0200 |
| | /mass % | Se | 0 | 0 | 0 | 0 | 0.0004 | 0 | 0.0010 |
| | /mass % | $Cr_2O_3$ | 0 | 0 | 0 | 0.01 | 0 | 0 | 0.0300 |
| | /mass % | NiO | 0.0540 | 0.0540 | 0.0400 | 0.0450 | 0.0450 | 0.0400 | 0 |
| | /% | Redox | 24.2 | 24.2 | 21.8 | 24.2 | 24.2 | 24.2 | 26.0 |
| | /mass % | $Fe_2O_3 + TiO_2$ | 1.86 | 2.36 | 3.56 | 2.86 | 3.56 | 1.86 | 2.88 |
| | Value of left side of formula (a) | | 0.011 | 0.012 | 0.014 | 0.016 | 0.003 | 0.015 | 0.019 |
| Optical properties (sheet thickness: 3.5 mm) | /% | TVA | 15.3 | 15.2 | 16.7 | 16.1 | 16.5 | 15.9 | 13.4 |
| | /% | TE | 10.4 | 10.4 | 11.1 | 9.7 | 10.8 | 11.0 | 5.8 |
| | /% | TUV | 1.8 | 1.6 | 0.8 | 1.4 | 0.9 | 1.8 | 1.0 |
| | /% | TUV400 | 3.3 | 3.3 | 2.5 | 3.3 | 2.7 | 3.3 | 2.9 |
| | | x | 0.3082 | 0.3137 | 0.3237 | 0.3194 | 0.3411 | 0.2919 | 0.3027 |
| | | y | 0.3548 | 0.3628 | 0.3775 | 0.3741 | 0.3891 | 0.3381 | 0.3554 |
| | Value of right side of formula (1) | | 0.037 | 0.049 | 0.071 | 0.065 | 0.096 | 0.009 | 0.034 |
| | Value of right side of formula (2) | | 0.016 | 0.016 | 0.017 | 0.019 | 0.004 | 0.022 | 0.024 |

TABLE 2

| | | | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|
| Composition | /mass % | $Fe_2O_3$ | 1.12 | 1.18 | 1.06 | 1.22 | 1.22 | 1.40 | 1.06 | 1.85 | |
| | /mass % | FeO | 0.38 | 0.21 | 0.21 | 0.42 | 0.42 | 0.24 | 0.44 | 0.45 | |
| | /mass % | $TiO_2$ | 1.5 | 2.1 | 2.9 | 0.2 | 0.2 | 0.2 | 2.7 | 2.97 | |
| | /mass % | CoO | 0.0250 | 0.0348 | 0.0378 | 0.0390 | 0.0120 | 0.0440 | 0.0229 | 0.0285 | |
| | /mass % | Se | 0.0015 | 0.0000 | 0.0004 | 0.0020 | 0.0020 | 0.0014 | 0.0010 | 0.0005 | |
| | /mass % | $Cr_2O_3$ | 0.0400 | 0 | 0 | 0.0030 | 0.0030 | 0.0010 | 0.0102 | 0.0008 | |
| | /mass % | NiO | 0 | 0.0660 | 0 | 0.0530 | 0 | 0.0700 | 0.0150 | 0.0185 | 0 |
| | /% | Redox | 28.0 | 16.5 | 18.0 | 27.7 | 27.7 | 16.0 | 31.6 | 21.5 | |
| | /mass % | $Fe_2O_3 + TiO_2$ | 2.62 | 3.28 | 3.96 | 1.37 | 1.37 | 1.60 | 3.76 | 4.82 | |
| | Value of left side of formula (a) | | 0.016 | 0.013 | 0.010 | −0.005 | −0.032 | −0.007 | 0.013 | 0.023 | |
| Optical properties (sheet thickness: 3.5 mm) | /% | TVA | 9.2 | 8.1 | 9.2 | 9.5 | 9.3 | 8.0 | 15.3 | 13.1 | |
| | /% | TE | 5.8 | 18.5 | 5.8 | 7.7 | 5.3 | 17.5 | 10.8 | 9.5 | |
| | /% | TUV | 1.2 | 1.3 | 1.2 | 1.4 | 1.7 | 1.3 | 0.4 | 0.0 | |
| | /% | TUV400 | 3.1 | 3.2 | 3.1 | 3.3 | 3.3 | 3.2 | 1.4 | 0.4 | |
| | | x | 0.2952 | 0.2891 | 0.2952 | 0.2816 | 0.3788 | 0.2697 | 0.3370 | 0.3269 | |
| | | y | 0.3429 | 0.3326 | 0.3429 | 0.3051 | 0.4020 | 0.2878 | 0.3908 | 0.3893 | |
| | Value of right side of formula (1) | | 0.016 | 0.001 | 0.016 | −0.032 | 0.136 | −0.058 | 0.094 | 0.086 | |
| | Value of right side of formula (2) | | 0.022 | 0.020 | 0.022 | 0.003 | −0.035 | 0.002 | 0.012 | 0.024 | |

The glasses of the Invention Examples satisfying all of requirements relating to the glass composition each satisfied the requirements relating to optical properties at a sheet thickness of 3.5 mm. In the glass of Example 11 that does not satisfy the requirement relating to the contents of NiO and CoO (in the case where NiO is 0%, CoO is 0.01% or more and 0.032% or less) and does not satisfy the formula (a), optical properties at a sheet thickness of 3.5 mm did not satisfy the requirement of the formula (1). In the glass of Example 12 that does not satisfy the requirement relating to the contents of NiO and CoO (in the case where NiO is more than 0.06%, CoO is more than 0.032% and 0.04% or less) and does not satisfy the formula (a), optical properties at a sheet thickness of 3.5 mm did not satisfy the requirement of the formula (2). In the glass of Example 13 that contains more than 0.04% of CoO and does not satisfy the formula (a), optical properties at a sheet thickness of 3.5 mm did not satisfy the requirement of the formula (1).

Although the present invention has been described in detail and by reference to the specific embodiments, it is apparent to one skilled in the art that various modifications or changes can be made without departing the spirit and scope of the present invention. This application is based on Japanese Patent Application (No. 2015-179719) filed on Sep. 11, 2015, the disclosure of which is incorporated herein by reference.

The invention claimed is:

1. An ultraviolet absorbing glass article comprising, in mass % based on oxides:

| | |
|---|---|
| $SiO_2$ | 66 to 75%, |
| $Na_2O$ | 10 to 20%, |
| CaO | 5 to 15%, |
| MgO | 0 to 6%, |
| $Al_2O_3$ | 0 to 5%, |
| $K_2O$ | 0 to 5%, |
| $Fe_2O_3$ | 0.5 to 3%, |
| FeO | 0.2 to 0.5%, |
| $TiO_2$ | 0.1 to 3%, |
| CoO | 0.014 to 0.04%, |
| Se | 0.0001 to 0.004%, |
| $Cr_2O_3$ | 0.06% or less, and |
| NiO | 0.1% or less, | as a glass matrix composition, a Redox, which is (a content of divalent iron ($Fe^{2+}$) in terms of $Fe_2O_3$)/(a total content of divalent iron ($Fe^{2+}$) in terms of $Fe_2O_3$ and trivalent iron ($Fe^{3+}$) in terms of $Fe_2O_3$), being 15 to 35%, a content of $Fe_2O_3+TiO_2$ being 1.2% or more, the content of CoO being 0.014% or more and 0.032% or less in the case where a content of NiO is 0%, the content of CoO being more than 0.032% and 0.04% or less in the case where the content of NiO is more than 0.06% and 0.1% or less, and the content of CoO being 0.014 to 0.04% in the case where the content of NiO is more than 0% and 0.06% or less, the contents of $Fe_2O_3$, FeO, $TiO_2$, CoO, Se, $Cr_2O_3$ and NiO satisfying formula (a), the ultraviolet absorbing glass article having:

an ultraviolet transmittance (TUV) specified by ISO 9050:2003 at a sheet thickness of 3.5 mm being 2% or less, a visible light transmittance (TVA) based on a Standard Illuminant A at a sheet thickness of 3.5 mm being 10% or more and 16.7% or less, and a color of the glass represented by chromaticity coordinates x and y in a XYZ color coordinate system based on a two-degree visual field of a Standard Illuminant C specified by JIS Z8701:1999 satisfying formulae (1) and (2):

$$-0.0398-0.002\times(Fe_2O_3)+0.097\times(FeO)+0.0019\times(TiO_2)+0.95\times(CoO)-21.16\times(Se)+0.66\times(Cr_2O_3)-0.030\times(NiO)\geq 0 \quad (a)$$

$$y\geq -0.735\times x+0.544 \quad (1)$$

$$y\geq 1.389\times x-0.089 \quad (2).$$

2. The ultraviolet absorbing glass article according to claim 1, wherein the content of $Cr_2O_3$ is 0.04% or less.

3. The ultraviolet absorbing glass article according to claim 1, wherein the content of CoO is 0.0170% or more.

4. The ultraviolet absorbing glass article according to claim 1, wherein the content of NiO is 0.07% or less.

5. The ultraviolet absorbing glass article according to claim 1, wherein the content of $Fe_2O_3$ is 0.5 to 1.85%.

6. The ultraviolet absorbing glass article according to claim 1, wherein the content of $Fe_2O_3$ is 1 to 1.85%.

7. The ultraviolet absorbing glass article according to claim 1, wherein the content of $Fe_2O_3$ is 0.5 to 1.6%.

8. The ultraviolet absorbing glass article according to claim 1, wherein the content of FeO is 0.30 to 0.5%.

9. The ultraviolet absorbing glass article according to claim 1, wherein the content of FeO is 0.2 to 0.39%.

10. The ultraviolet absorbing glass article according to claim 1, wherein the content of $TiO_2$ is 0.4 to 3%.

11. The ultraviolet absorbing glass article according to claim 1, wherein the content of $Fe_2O_3+TiO_2$ is 1.5% or more.

12. The ultraviolet absorbing glass article according to claim 1, wherein the content of CoO is 0.014 to 0.022% in the case where the content of NiO is more than 0% and 0.06% or less.

13. The ultraviolet absorbing glass article according to claim 1, wherein the content of CoO is 0.0170% to 0.04% in the case where the content of NiO is more than 0% and 0.06% or less.

14. The ultraviolet absorbing glass article according to claim 1, wherein the content of CoO is 0.020% or more and 0.032% or less in the case where the content of NiO is 0%.

15. The ultraviolet absorbing glass article according to claim 1, wherein the content of CoO is 0.014% or more and 0.0285% or less in the case where the content of NiO is 0%.

16. The ultraviolet absorbing glass article according to claim 1, having an energy transmittance (TE) specified by JIS-R3106:1998 at a sheet thickness of 3.5 mm being 22% or less.

17. The ultraviolet absorbing glass article according to claim 1, having the ultraviolet transmittance (TUV) specified by ISO 9050:2003 at a sheet thickness of 3.5 mm being 1% or less.

18. The ultraviolet absorbing glass article according to claim 1, having an ultraviolet transmittance (TUV400) specified by ISO 13837:2008 convention A at a sheet thickness of 3.5 mm being 5% or less.

* * * * *